United States Patent

Arisaka et al.

[11] Patent Number: 6,048,147
[45] Date of Patent: Apr. 11, 2000

[54] FIXING CLIP FOR FIXING ATTACHMENT MEMBER TO PANEL

[75] Inventors: Oomi Arisaka; Shigeo Okada, both of Yokohama, Japan

[73] Assignee: Piolax, Inc., Kanagawa-Ken, Japan

[21] Appl. No.: 09/285,418

[22] Filed: Apr. 2, 1999

[30] Foreign Application Priority Data

Apr. 3, 1998 [JP] Japan .................................. 10-091701

[51] Int. Cl.⁷ ............................. F16B 13/04; F16B 13/06
[52] U.S. Cl. ................................. 411/48; 411/41; 411/53; 411/902; 411/907
[58] Field of Search ................................. 41/41, 45, 46, 41/48, 50, 51, 52, 53, 15, 902, 907

[56] References Cited

U.S. PATENT DOCUMENTS

| | | | |
|---|---|---|---|
| 5,375,954 | 12/1994 | Eguchi | 411/41 X |
| 5,542,158 | 8/1996 | Gronau et al. | |
| 5,632,581 | 5/1997 | Hasada | 411/53 X |
| 5,846,040 | 12/1998 | Ueno | 411/45 |

FOREIGN PATENT DOCUMENTS

| | | |
|---|---|---|
| 622610 U | 3/1994 | Japan . |
| 0653570A2 | 11/1994 | Japan . |
| 743591 | 1/1956 | United Kingdom . |
| 884123 | 12/1961 | United Kingdom . |

OTHER PUBLICATIONS

U.K. Search Report dated Jul. 7, 1999.

Certified Japanese Patent Application May 28, 1999.

*Primary Examiner*—Neill Wilson
*Attorney, Agent, or Firm*—Howard & Howard

[57] ABSTRACT

A fixing clip is provided for fixing an attachment member to a panel having an attachment hole. The fixing clip includes a grommet having a plurality of extensible leg pieces for engagement with a periphery of the attachment hole, a pin to be pressed into the grommet and a seal cap for accommodating the grommet. The seal cap has a plurality of extensible pleats formed in respective places corresponding to the leg pieces of the grommet. When the leg pieces of the grommet spread and engage with the periphery of the attachment hole of the panel through the seal cap, the pleats of the seal cap stretch out to follow the spreading leg pieces, so that the seal cap can be deformed easily. Therefore, there is no fear of reducing the engagement force of the leg pieces with the periphery of the attachment hole of the panel.

10 Claims, 6 Drawing Sheets

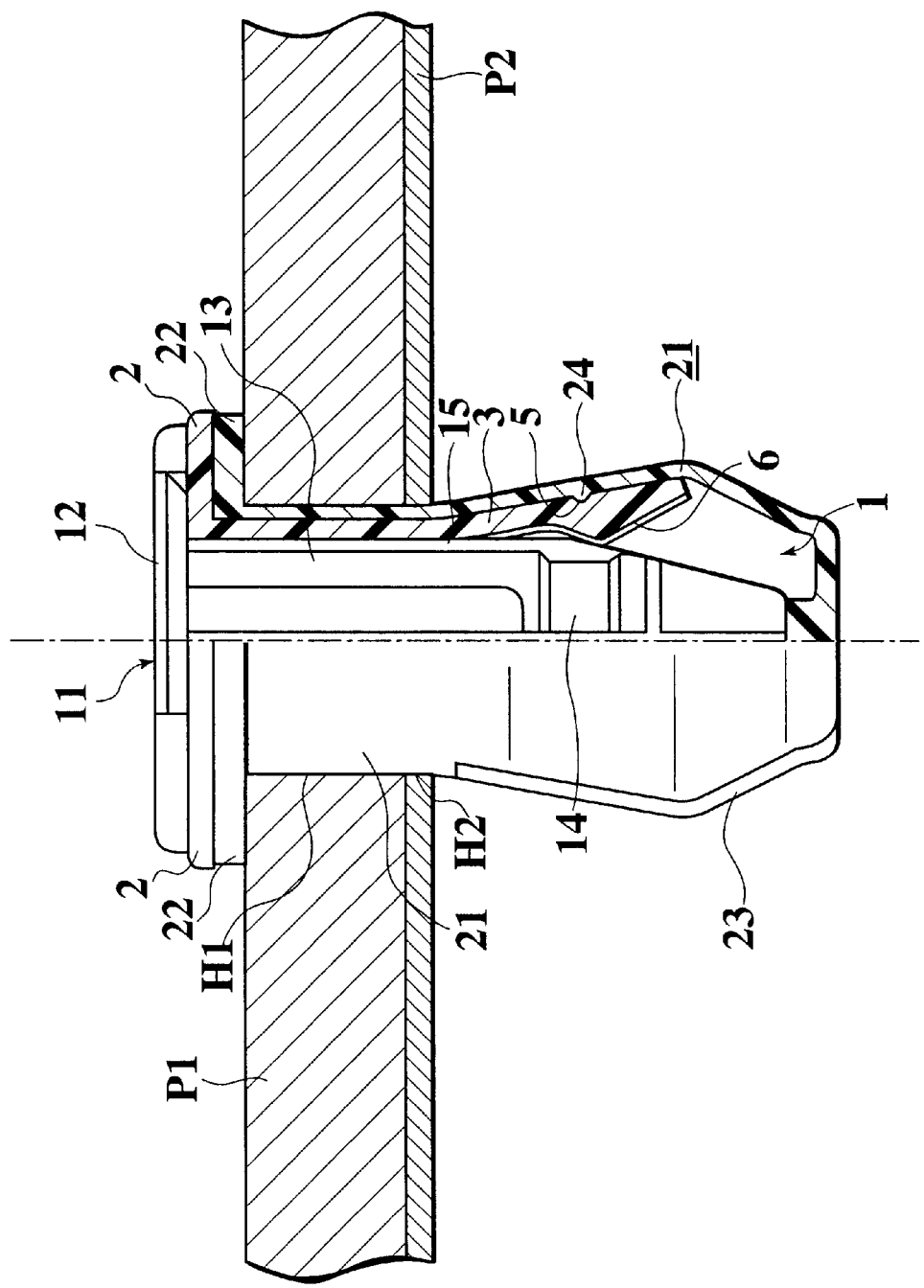

FIXING CLIP FOR FIXING ATTACHMENT MEMBER TO PANEL

BACKGROUND OF THE INVENTION

1. Field of the Invention

The present invention relates to a fixing clip for fixing an attachment member, such as a garnish for a land vehicle, to a designated panel.

2. Description of the Related Art

Japanese Utility Model Laid-open No. 6-22610 shows an earlier fixing clip.

A typical fixing clip consists of a grommet, a pin and a seal cap. The grommet is composed of a cylindrical body, a flange formed on an upper edge of the cylindrical body and a plurality of leg pieces provided on an underside of the cylindrical body so as to be extensible through slits. The pin of the fixing clip is in the form of a rod which is to be inserted into the cylindrical body of the grommet. The rod has engagement grooves formed on an intermediate periphery of the rod, for engagement with inward projections of the leg pieces of the cylindrical body. The seal cap is in the form of a cylindrical envelope with a flange and is constructed so as to accommodate the grommet therein.

When fixing the attachment member, such as the garnish, to the panel by means of the fixing clip, the seal cap is first attached to an attachment hole in the panel through the flange. Next, while allowing an inlet of the seal cap to coincide with an insertion hole formed in the attachment member, the grommet is inserted into the seal cap through the insertion hole of the attachment member, together with the pin temporarily assembled to the grommet in advance. Thereafter, when the pin is urged into the grommet perfectly, the engagement grooves of the pin engage with the inward projections of the leg pieces, so that they are spread outward inside the seal cap. In this way, the fixing of the attachment member to the side of the panel is completed.

Thus, according to the conventional fixing clip, it is possible to fix the attachment member to the panel while ensuring the water-tightness at the fixing point owing to the seal cap. However, since the seal cap is in the form of the cylindrical envelope in size allowing the cylindrical body of the grommet to be simply accommodated in the seal cap, the expansion of the leg pieces of the grommet by means of the pin requires expanding the seal cap by force while forcibly deforming the seal cap.

Therefore, it goes without saying that to shove the pin into the grommet is a burdensome task for a worker. In particular, unless the seal cap is sufficiently deformed corresponding to the expansion of the respective leg pieces, there is a possibility of lowering the engagement force of the seal cap against the periphery of the attachment hole in the panel due to an insufficient amount of expansion of the leg pieces.

SUMMARY OF THE INVENTION

It is therefore an object of the present invention to provide a fixing clip which is capable of solving the above-mentioned problem in the conventional fixing clip.

The object of the present invention described above can be accomplished by a fixing clip for fixing an attachment member to a panel having an attachment hole, the fixing clip comprising:

a clip body having a plurality of leg pieces to be expanded for engagement with a periphery of the attachment hole of the panel; and a seal cap to be fitted to the attachment hole, the seal cap adapted to accommodate the clip body therein;

wherein the seal cap has a plurality of extensible pleats formed in respective places corresponding to the leg pieces of the clip body.

In the above-mentioned invention, when the leg pieces of the clip body spread and engage with the periphery of the attachment hole of the panel through the seal cap, the pleats of the seal cap stretch out to follow the spreading leg pieces, so that the seal cap can be deformed easily. Therefore, there is no fear of reducing the engagement force of the leg pieces with the periphery of the attachment hole of the panel. Note, such a reduction of the engagement force has been conventionally caused by the insufficient expansion of the leg pieces and the subsequent insufficient displacement of the seal cap.

In the present invention, it is preferable that a portion of the seal cap, which corresponds to the attachment hole of the panel, has no pleats but a cross section similar to a profile of the attachment hole of the panel.

In this case, it is expected to ensure water-tightness between the seal cap and the attachment hole of the panel.

In the above case, more preferably, the pleats of the seal cap are arranged in slits of the clip body, which separate the leg pieces of the clip body from each other.

In this case, due to the provision of the slits, it is expected to allow the seal cap to be effectively deformed corresponding to the stretch of the leg pieces.

In the above case, more preferably, the portion of the seal cap having no pleats is provided, on an inner periphery thereof, with guide grooves which align with the pleats of the seal cap, respectively.

In this case, under the guidance of the slits and the guide grooves, it is possible to keep the clip body in the seal cap smooth while maintaining the position of the clip body.

According to the invention, there is also provided a fixing clip for fixing an attachment member to a panel having an attachment hole, the fixing clip comprising:

a grommet having a plurality of extensible leg pieces for engagement with a periphery of the attachment hole of the panel;

a pin to be pressed into the grommet to spread the leg pieces; and a seal cap for accommodating the grommet therein, the seal cap having a plurality of extensible pleats formed in respective places corresponding to the leg pieces of the grommet; wherein the grommet defines a space communicating with an inner periphery of the seal cap, and under the temporary assembling condition of the fixing clip consisting of the grommet, the pin and the seal cap, the pin partially comes into direct contact with the inner periphery of the seal cap through the space.

Also in this invention, it is possible to facilitate the seal cap's deformation. In addition, at the temporary assembling of the above three components, as the part of the pin directly comes into contact with the inner periphery of the seal cap through the space defined by the grommet, it is possible to obtain the temporary assembling condition by a remarkably simple method.

In the above-mentioned invention, preferably, the grommet has a plurality of slits each separating the neighboring leg pieces from each other, while the pin has a plurality of ribs formed for slide movement in the slits among the leg pieces, and the ribs come into direct contact with the inner periphery of the seal cap through the slits of the grommet.

In this case, since the ribs of the pin come into contact with the inner periphery of the seal cap through the slits of the grommet, it is possible to guarantee more reliable temporary assembling condition of the three components.

More preferably, the pin is composed of a flange in the form of a circular disc and a stem which is suspended from the flange and on which the ribs are formed.

In this case, owing to the provision of the pin with the flange, it is possible to facilitate the handling of the pin in assembling the fixing clip.

More preferably, the grommet is provided, on respective inner faces of the leg pieces, with inward projections. Similarly, it is preferable that the pin is provided, on an outer periphery thereof, with engagement grooves for engagement with the inward projections of the grommet.

In this case, with the engagement of the inward projections with the engagement grooves, the leg pieces can stretch out inside the seal cap, whereby the attachment member can be fixed on the panel instantly.

In the above-mentioned arrangement, more preferably, the seal cap is provided, on an inner periphery thereof, with a plurality of slip-proof projections, while the grommet is provided, on an outer periphery thereof, with a plurality of recesses for engagement with the slip-proof projections.

In this case, with the engagement of the slip-proof projections with the recesses, it is possible to prevent the grommet from slipping out of the seal cap.

Note, in the above-mentioned arrangements, the pin and the grommet may be made of synthetic resin, while the seal cap may be made of synthetic rubber.

The above and other features and advantages of this invention will become apparent, and the invention itself will best be understood, from a study of the following description and appended claims, with reference to the attached drawings showing a preferred embodiment of the invention.

BRIEF DESCRIPTION OF THE DRAWINGS

FIG. 6 is a semi-cross sectional view showing a condition where an attachment member is fixed on a panel.

DESCRIPTION OF THE PREFERRED EMBODIMENT

An embodiment of the present invention will be described with reference to the accompanying drawings.

Figure 1:
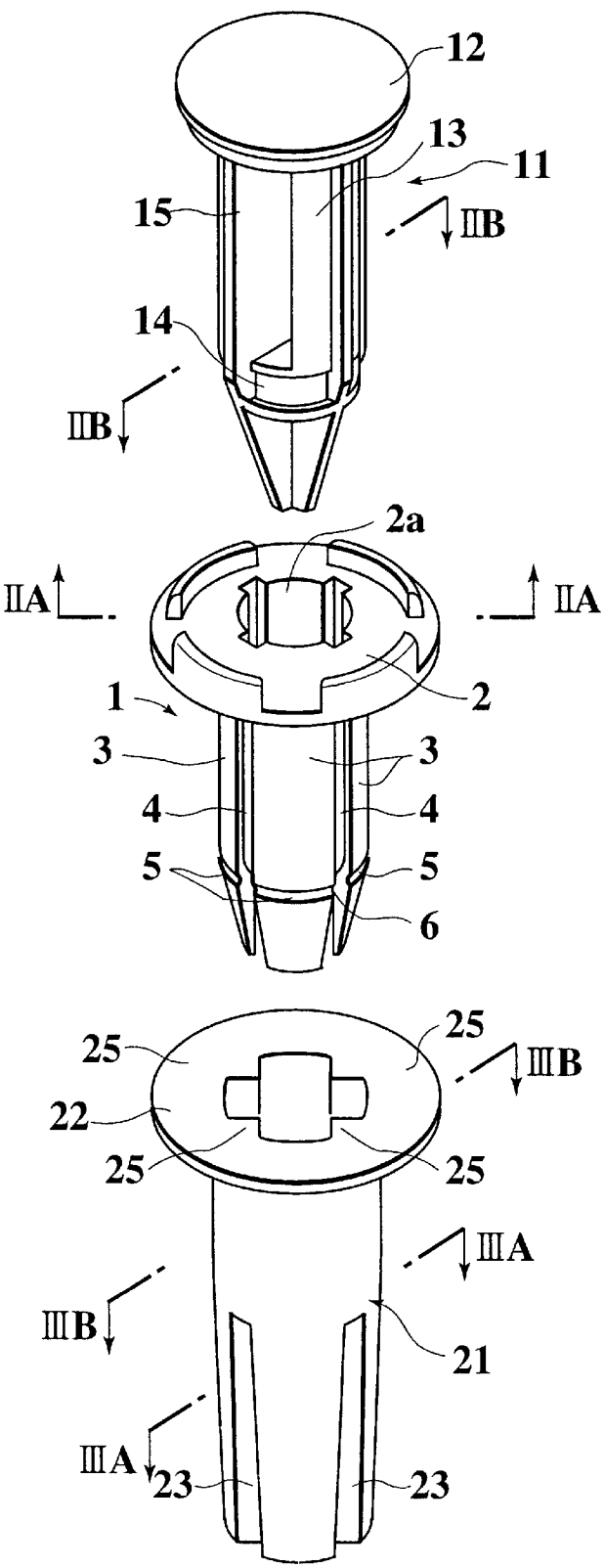
FIG. 1 is an exploded perspective view showing a fixing clip in accordance with an embodiment of the present invention.

As shown in FIG. 1, a fixing clip of the embodiment basically consists of three components: a grommet 1, a pin 11 and a seal cap 21, similar to the constitution of the aforementioned conventional fixing clip.

Figure 2A:
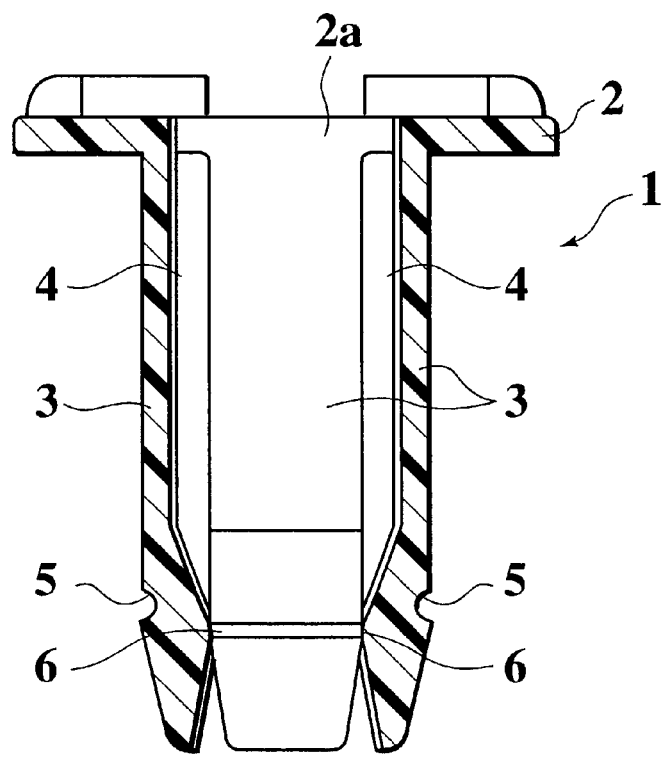
FIG. 2A is a cross sectional view taken along a line IIA—IIA of FIG. 1

The grommet 1 comprises a disc-shaped flange 2 made of synthetic resin and formed to have a central through hole 2a and four leg pieces 3 also made of synthetic resin and suspended from a lower margin of the through hole 2a of the flange 2, as shown in FIG. 2A. The flange 2 and the leg pieces 3 are formed into one body. The leg pieces 3 are equally separated from each other through slits 4 extending over the full length of the pieces 4. Each leg piece 3 has a recess 5 formed on an outer periphery close to a tip of the leg piece 3 and an inward projection 6 formed on the inner periphery.

Figure 2B:
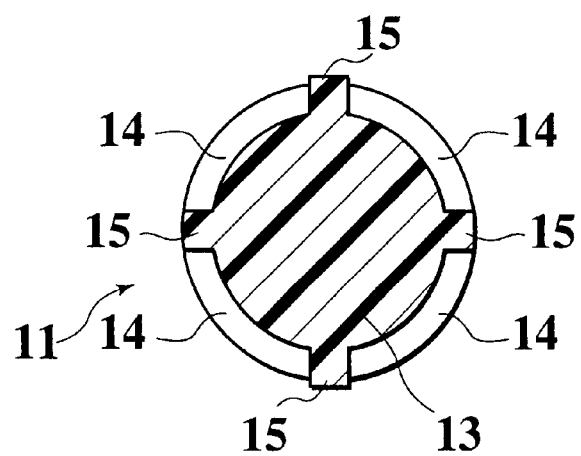
FIG. 2B is a cross sectional view taken along a line IIB—IIB of FIG. 1.
Figure 3A:
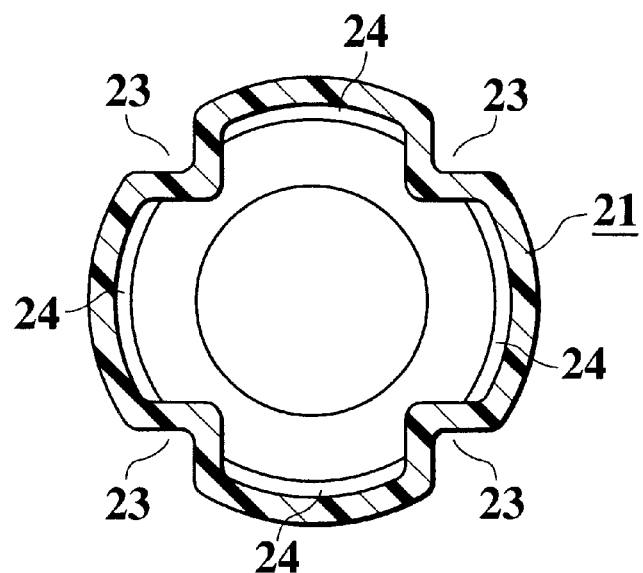
FIG. 3A is a cross sectional view taken along a line IIIA—IIIA of FIG. 1
Figure 3B:
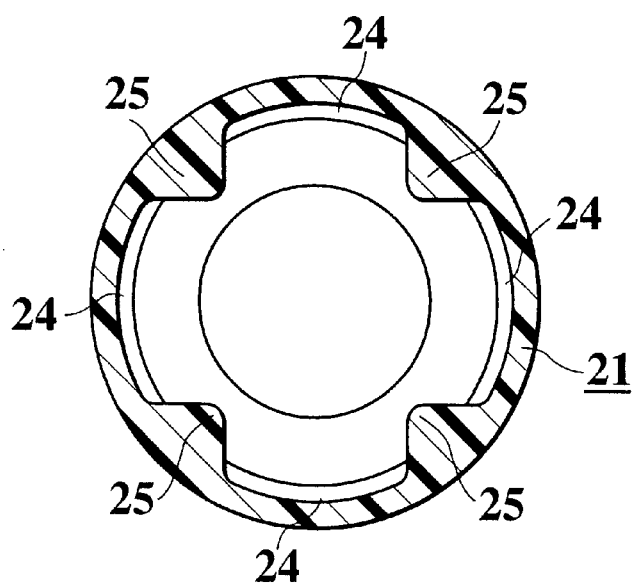
FIG. 3B is a cross sectional view taken along a line IIIB—IIIB.

Similarly, the pin 11 is integrally made of synthetic resin and comprises a flange 12 in the form of a disc and a tapering stem 13 suspended from a bottom face of the flange 12, as shown in FIG. 2B. The stem 13 is provided, near a leading end thereof, with engagement grooves 14 for engagement with the inward projections 6 of the leg pieces 3. Further, on the outer periphery of the stem 13 from the engagement grooves 14 to the flange 12, four ribs 15 are formed at regular circumferential intervals in the longitudinal direction of the stem 13, allowing for sliding movement of the slits 4 and forcing separation of the leg pieces 3.

The seal cap 21 is integrally made of soft synthetic rubber and shaped in the form of a cylindrical envelope provided, on an upper end thereof, with a ring-shaped flange 22, as shown in FIG. 1. Beginning at a generally intermediate portion of the seal cap 21 toward the bottom in the longitudinal direction, four extensible pleats 23 are formed at regular intervals, coinciding with the leg pieces 3 of the grommet 1. The extensible pleats 23 are sunken inward, along the radial axis, in a V-shaped manner. Further, the seal cap 21 has a plurality of slip-proof projections 24 each formed between the neighboring pleats 23 on the inner face of the cap 21, for engagement with each recess 5. The upper portion of the cap 21 having no pleats 23 has a cross section of a regular circle similar to a profile of a circular attachment hole formed in a panel mentioned later. The upper portion of the cap 21 further includes four V-shaped guide projections 25 each formed so as to extend in the inner periphery of the cap 21 longitudinally, aligned with each sunken V-shaped pleat 23.

Figure 4:
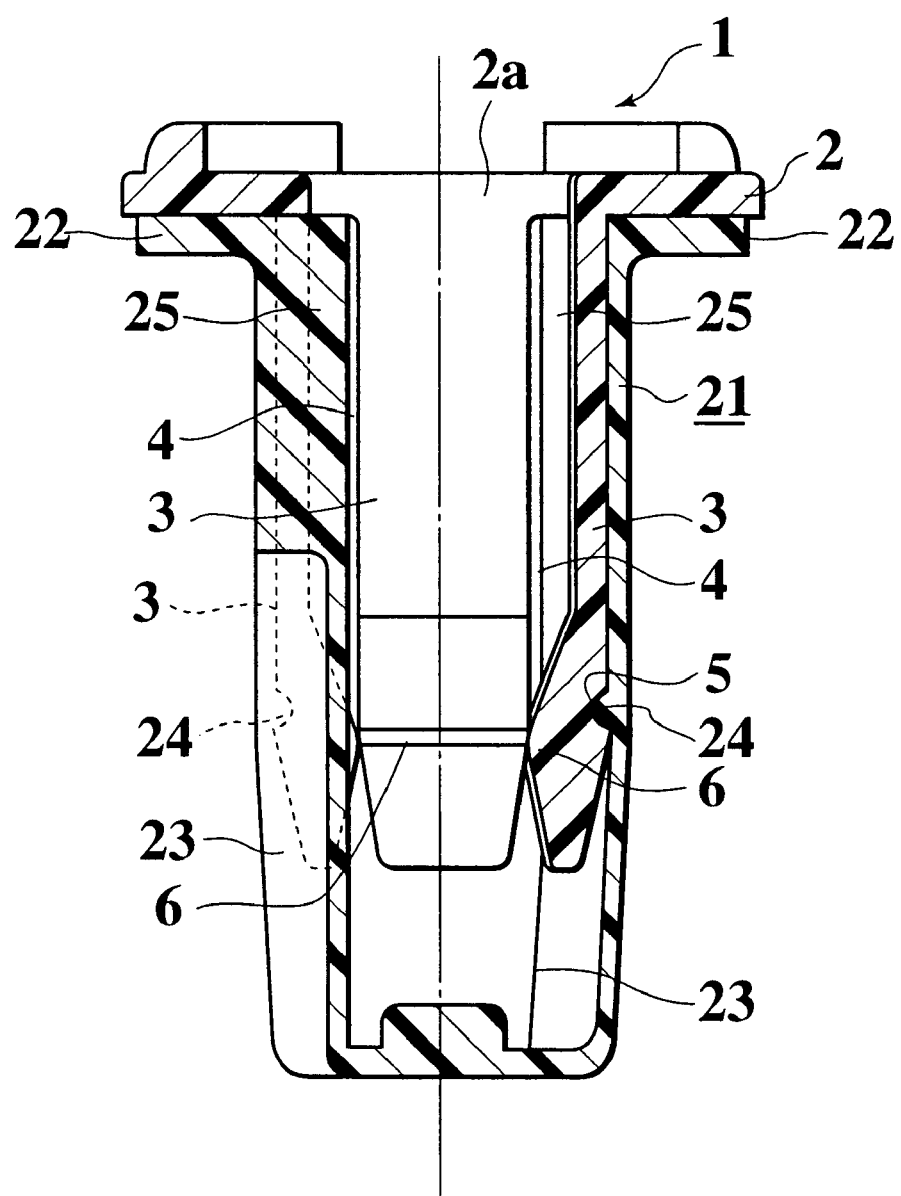
FIG. 4 is a cross sectional view showing a condition where a grommet is accommodated iin a al cap of the fixing clip of the invention.

Referring to FIGS. 4 and 6, prior to fixing the attachment member P1, such as a garnish, on the panel P2 via the fixing clip, composed of the three components mentioned above, the grommet 1 is first placed inside the seal cap 21 for the temporary assembly of the two components (1, 21). During this assembly, the alignment of the respective guide projections 25 on the inner periphery of the seal cap 21 with the respective slits 4 separating the leg pieces 3 of the grommet 1 make it possible to smoothly accommodate the grommet 1 in the seal cap 21 while positioning the grommet 1 against the seal cap 21.

Furthermore, since the pleats 23 on the lower side of the cap 21 are formed so as to align with the guide projections 25, it is possible to maintain the guiding action of the slits 4 on the lower side of the cap 21 by the pleats 23. Then, as each projection 24 of the seal cap 31 fits in the recess 5 of each leg piece 3, there is no possibility of the grommet 1 accidentally slipping off the seal cap 21. Note, under such a fitting condition, the pleats 23 of the seal cap 21 receive the slits 4 and separate the leg pieces 3 of the grommet 1, respectively.

Figure 5:
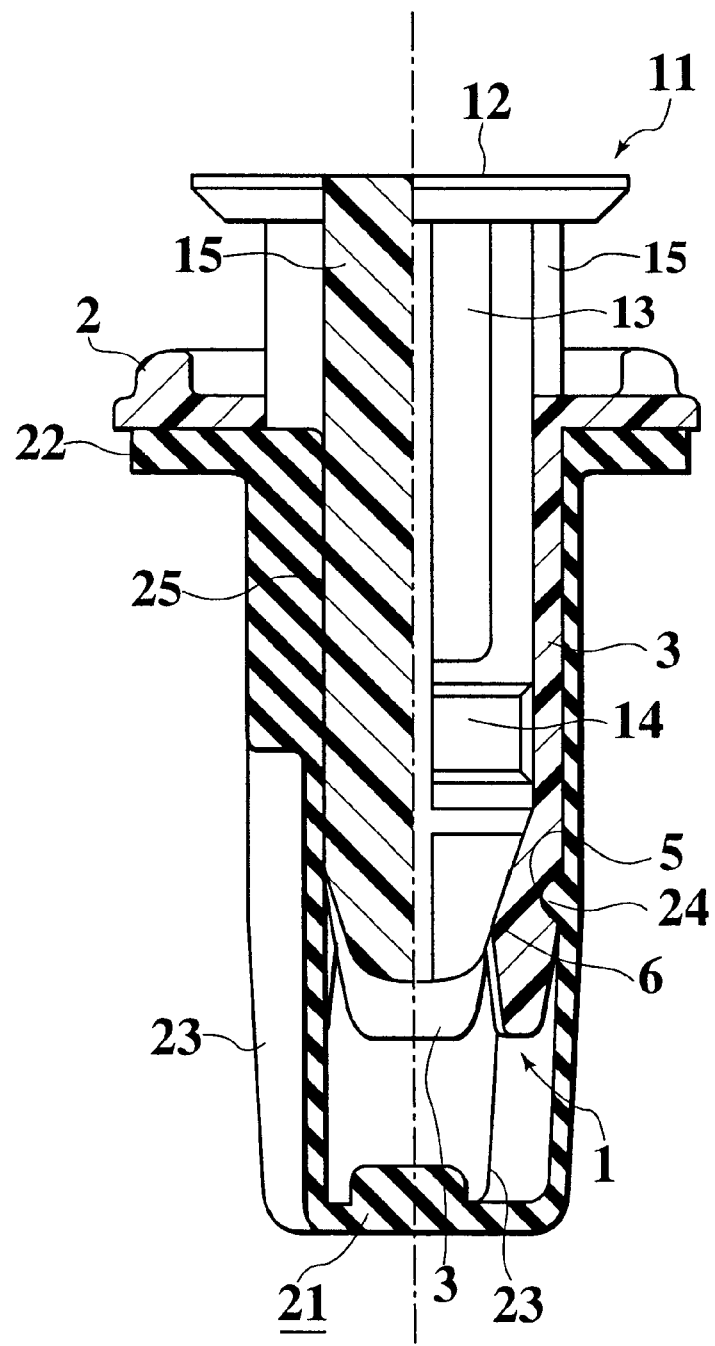
FIG. 5 is a cross sectional view showing a condition where the grommet, a pin and the seal cap are assembled temporarily.

Next, the pin 11 is temporarily placed into the grommet 1. Then, as shown in FIG. 5, the pressing of the pin 11 into the grommet 1 causes the ribs 15 of the pin 11 to come into direct contact with the guide projections 25 and the accompanying pleats 23 on the inner peripheral side of the seal cap 21 through the slits 4 among the leg pieces 3 of the grommet 1, so that the pin 11 directly engages in the seal cap 21. In this way, the temporary assembly state of three components, (1, 11, 21) constituting the fixing clip of the invention, is accomplished. Due to this configuration in the temporary assembly state, it is possible to eliminate the possibility of three components' separating from each other when handling the unit.

After completion of the above-mentioned temporary assembly, the seal cap 21 is installed in both an attachment hole H1 formed in the attachment member P1 and an attachment hole H2 formed in the panel P2 through the flange 22 providing that the circular hole H1 of the attachment member P1 coincides with the circular hole H2 of the panel P2. Thereafter, as shown in FIG. 6, the perfect alignment of the stem 13 and the pin 11 under the guidance of the ribs 15 and the slits 4 among the leg pieces 3, causes the engagement grooves 14 to engage with the inward projections 6 of the grommet 1, so that the respective leg pieces 3 spread out in the seal cap 21. Consequently, the attachment member P1 can be secured on the panel P2 instantly.

According to the embodiment, since four stretchable pleats 23 are arranged in respective positions corresponding to the leg pieces 3 of the grommet 1, when the pieces 3 are forcibly spread by the pin 11, then the pleats 23 stretch outward due to their own elasticity, thereby allowing the lower part of the seal cap 21 to be spread easily. Therefore, there is no fear of reducing the engagement force of the leg pieces 3 with the periphery of the attachment hole H2 of the panel P2, which has been caused by the insufficient expansion of the leg pieces 3 and the sequent insufficient displacement of the seal cap 21 conventionally. Thus, according to the embodiment of this invention, it is possible to guarantee the reliable and stable form of the clip about the attachment member P1 while maintaining the sufficient water-tightness, in spite of the existence of the seal cap 21.

Moreover, due to the arrangement wherein each pleat 23 is disposed within a slit 4 between the adjacent leg pieces 3, along with the flexibility of the seal cap 21, pressing the pin 11 does not require an enormous amount of force because the seal cap 21 can be deformed easily. Consequently, it is possible for a worker to press the point 11 into the grommet 1 with ease.

Additionally, since the upper portion of the seal cap 21, having no pleats 23 is shaped to have a cross section of regular circle, which is similar to the attachment hole H2 of the panel P2, it is possible to guarantee the water-tightness about the hole H2, in cooperation with the flange 22 on the seal cap 21.

Finally, it will be understood by those skilled in the art that the foregoing description is one preferred embodiment of the disclosed fixing clip and that various changes and modifications may be made to the present invention without departing from the spirit and scope thereof.

What is claimed is:

1. A fixing clip for fixing an attachment member to a panel having an attachment hole, the clip comprising:

a clip body having a plurality of leg pieces to be expanded for engaging the attachment member with the panel; and a seal cap to be fitted to the attachment hole, the seal cap adapted to accommodate the clip body therein;

wherein the seal cap has a plurality of extensible pleats formed in respective places corresponding to the leg pieces of the clip body.

2. A fixing clip as claimed in claim 1, wherein a portion of the seal cap, which corresponds to the attachment hole of the panel, has no pleats but a cross section similar to a profile of the attachment hole of the panel.

3. A fixing clip as claimed in claim 2, wherein the pleats of the seal cap are aligned with slits of the clip body, which separate the leg pieces of the clip body from each other.

4. A fixing clip as claimed in claim 3, wherein the portion of the seal cap having no pleats is provided, on an inner periphery thereof, with guide grooves which are aligned with the pleats of the seal cap, respectively.

5. A fixing clip for fixing an attachment member to a panel having an attachment hole, the fixing clip comprising:

a grommet having a plurality of extensible leg pieces for engaging the attachment member with the panel;

a pin to be pressed into the grommet to spread the leg pieces; and a seal cap for accommodating the grommet therein, the seal cap having a plurality of extensible pleats formed in respective places corresponding to the leg pieces of the grommet; wherein the grommet defines a space communicating with an inner periphery of the seal cap, and under the temporary assembling condition of the fixing clip consisting of the grommet, the pin and the seal cap, the pin partially comes into direct contact with the inner periphery of the seal cap through the space.

6. A fixing clip as claimed in claim 5, wherein the grommet has a plurality of slits each separating the neighboring leg pieces from each other, while the pin has a plurality of ribs formed for sliding movement in the slits among the leg pieces, and the ribs come into direct contact with the inner periphery of the seal cap through the slits of the grommet.

7. A fixing clip as claimed in claim 6, wherein the pin is composed of a flange in the form of a circular disc and a stem suspended from the flange; and the ribs are formed on the stem.

8. A fixing clip as claimed in claim 7, wherein the grommet is provided, on respective inner faces of the leg pieces, with inward projections; and the pin is provided, on an outer periphery thereof, with engagement grooves for engagement with the inward projections of the grommet.

9. A fixing clip as claimed in claim 8, wherein the seal cap is provided, on an inner periphery thereof, with a plurality of slip-proof projections; and the grommet is provided, on an outer periphery thereof, with a plurality of recesses for engagement with the slip-proof projections.

10. A fixing clip as claimed in claim 6, wherein the pin and the grommet are made of synthetic resin, while the seal cap is made of synthetic rubber.

* * * * *